(12) United States Patent
Lee et al.

(10) Patent No.: US 7,624,243 B2
(45) Date of Patent: *Nov. 24, 2009

(54) APPARATUS AND METHOD FOR PROTECTING SYSTEM DATA ON COMPUTER HARD-DISK

(76) Inventors: Chang-Ju Lee, 136-2101 Kwanack Dreamtown, Boncheon-5-Dong, Gwanack-Ku, Seoul 151-774 (KR); Young-Uck Jeon, 902-202 Kumkang Apt., 1148-4 Sanbon-Dong, Kunpo-Shi, Kyungki-Do 435-040 (KR); Sung-Uk Oh, 305-1504 Poonglim Apt., Daehwa-Dong, Ilsan-Ku, Koyang-Shi, Kyungki-Do 411-707 (KR)

( * ) Notice: Subject to any disclaimer, the term of this patent is extended or adjusted under 35 U.S.C. 154(b) by 466 days.

This patent is subject to a terminal disclaimer.

(21) Appl. No.: 11/596,275

(22) PCT Filed: Jun. 3, 2005

(86) PCT No.: PCT/KR2005/001668

§ 371 (c)(1),
(2), (4) Date: Nov. 13, 2006

(87) PCT Pub. No.: WO2005/119458

PCT Pub. Date: Dec. 15, 2005

(65) Prior Publication Data

US 2008/0028004 A1    Jan. 31, 2008

(30) Foreign Application Priority Data

Jun. 4, 2004    (KR)    ................ 10-2004-0040869

(51) Int. Cl.
G06F 12/00    (2006.01)
G06F 13/00    (2006.01)
G06F 13/28    (2006.01)
G06F 17/30    (2006.01)

(52) U.S. Cl. ............... 711/163; 711/154; 711/170; 711/173; 707/202

(58) Field of Classification Search ............ 711/163
See application file for complete search history.

(56) References Cited

U.S. PATENT DOCUMENTS 7,305,577 B2 *  12/2007  Zhang ..................... 714/6

(Continued)

FOREIGN PATENT DOCUMENTS

JP    1998-240597    9/1998

(Continued)

OTHER PUBLICATIONS

Written Opinion of the International Searching Authority;Int'l Appl No. PCT/KR2005/001668; Date: Oct. 11, 2005.

(Continued)

*Primary Examiner*—Christian P Chace
*Assistant Examiner*—Ryan Bertram
(74) *Attorney, Agent, or Firm*—Cantor Colburn LLP (57) ABSTRACT

An apparatus and method for protecting and recovering system data stored in a computer hard disk from corruption that may occur due to malicious or accidental operation during use of a computer are provided. According to the apparatus and method, not an entire system area but a part needing protection in the system area is selectively protected in a buffer area by using a system area information table and a mapping table, thereby remarkably reducing the size of the necessary buffer area.

8 Claims, 11 Drawing Sheets

U.S. PATENT DOCUMENTS

| | | | |
|---|---|---|---|
| 7,395,402 B2 * | 7/2008 | Wilson et al. | 711/173 |
| 7,469,261 B2 * | 12/2008 | Lee et al. | 707/200 |
| 2005/0081004 A1 * | 4/2005 | Zhang | 711/162 |

FOREIGN PATENT DOCUMENTS

| KR | 1019980076358 A | 11/1998 |
|---|---|---|
| KR | 1020010019732 A | 3/2001 |
| KR | 1020020024227 A | 3/2002 |
| KR | 1020020097344 A | 12/2002 |

OTHER PUBLICATIONS

International Search Report; Int'l Appl No. PCT/KR2005/001668; Date: Oct. 11, 2005 All references in the Search Report are listed above.

* cited by examiner

| SYSTEM AREA(6) | | BUFFER AREA(7) | | | |
|---|---|---|---|---|---|
| USED SPACE | EMPTY SPACE | META INFORMATION TABLE(71) | SYSTEM AREA INFORMATION TABLE(72) | MAPPING TABLE(73) | DATA BUFFER AREA(74) |

APPARATUS AND METHOD FOR PROTECTING SYSTEM DATA ON COMPUTER HARD-DISK

TECHNICAL FIELD

The present invention relates to an apparatus and method for protecting system data stored in a computer hard disk, and more particularly, to a system data protection apparatus and method for protecting and recovering system data stored in a computer hard disk from corruption that may occur due to malicious or accidental operation during use of a computer.

BACKGROUND ART

Generally, a variety of programs (or softwares) are installed in a computer system to drive hardware of a computer such that the hardware and the softwares operate in organic association to execute jobs desired by a user.

During use of a computer, it frequently happens that system data stored in a hard disk is fatally damaged by attack of diverse virus programs or a user's carelessness, mistake, or malicious behaviors. Besides, an unexpected situation or installation or removal of a particular program may cause trouble in the operation of a computer system.

To cope with the above-described problems occurring in a computer system, the following conventional techniques are used to protect data stored in a computer hard disk.

Firstly, a vaccine program is used to protect a computer system from a virus program or to cure a computer system attacked by a virus program. This technique is useful to protect a computer system from already known virus programs but is useless against new virus programs. In addition, even if a virus program has already been known, it frequently happens that system data corrupted by the virus program is not recovered and there is no way but to delete the corrupted system data. Deletion of the system data fatally damages an operating system of the computer, resulting in abnormal operation of the operating system.

Secondly, after programs necessary for a computer system are installed, images in a hard disk is stored in another recording medium (for example, a compact disk-read only memory (CD-ROM)), and the images stored in the recording medium are copied to the hard disk when trouble occurs in the computer system in order to recover corrupted data. According to this technique, a user needs to backup the images stored in the hard disk whenever installing a new program in or deleting a program from the hard disk or recording important data onto the hard disk. A job of backing up the images in the hard disk to another recording medium and recovering the computer system using the backed-up hard disk images requires an extra recording medium and a lot of working time, and it is also very complex.

Thirdly, while the original of a system data is kept in a hard disk as it is, only changed content is stored in a separate system change area. When a wrong change occurs in a system protection area due to a virus program or a user's carelessness, a computer system can be easily recovered by deleting the content stored in the system change area. However, since all data (i.e., both of a used area and an empty area) in the system protection area set by a hard disk dividing unit is protected, a large buffer area (i.e., the system change area) is required to protect the system data. In other words, the size of the buffer area must be the same as that of the system protection area to protect the system data stored in the system protection area without recovery operation. For example, to protect a 120-gigabyte system protection area, a capacity of 120 gigabytes for all system data reflected to the system protection area and additional memory space for other data are required.

Moreover, since the empty area included in the system protection area is also protected, an overload is given to an access to the system data after a hard disk protection program is installed. As a result, the speed of the computer system decreases and the empty area in the system protection area cannot be used at all. In addition, after system recovery, the computer system must be booted in a manager mode and program reinstallation must be performed in order to change a recovery original. Accordingly, it is inconvenient to change the recovery original and it takes a lot of time to create a new recovery original. Besides, if there is an attack of a virus program or a user makes a mistake in installing a program in a state where the computer system has been booted in manager mode to change the recovery original, the computer system cannot be recovered to normal.

DISCLOSURE OF THE INVENTION

The present invention provides an apparatus and method for protecting system data on a computer hard disk, by which a system area information table is provided to set a protection target among data in a system area in units of clusters and a mapping table is provided to construct a correspondence relation between an original cluster and a changed cluster stored in a buffer area, thereby quickly recovering system data needing protection when the system data is corrupted while a computer system is being used.

The present invention also provides a computer readable recording medium for recording a program for executing the method on a computer.

According to an aspect of the present invention, there is provided an apparatus for protecting system data on a computer hard disk using a system area information table and a mapping table. The apparatus includes an installation unit separately setting a system area and a buffer area on the computer hard disk and reserving areas for a meta information table, the system area information table, and the mapping table, respectively, and a data buffer area in the buffer area; an initialization/recovery unit marking individual clusters in the system area with protection information in the system area information table based on one of a volume bitmap and a file allocation table (FAT) and initializing the mapping table and the data buffer area in the buffer area; a write operation processing unit, with respect to a write operation on a cluster of the system area designated by a file system, performing the write operation on a cluster of the data buffer area designated by the mapping table when the cluster of the system area is marked as "protected" in the system area information table, and performing the write operation on the cluster of the system area designated by the file system when the cluster of the system area is marked as "non-protected"; a read operation processing unit, with respect to a read operation on a cluster of the system area designated by the file system, performing the read operation on a cluster of the data buffer area designated by the mapping table, and performing the read operation on the cluster of the system area designated by the file system only when a value corresponding to the cluster of the system area indicates an initial state in the mapping table; a current state backup unit sequentially reading all items of the mapping table one by one, reading data from a cluster of the data buffer area designated by a value of a read item of the mapping table and writing the data to a cluster of the system area corresponding to the cluster of the data buffer area when the value of the item does not indicate an initial state, and then calling the initialization/recovery unit to perform initialization; and a removing unit removing the buffer area set by the installation unit to integrate the system area and the buffer area.

According to another aspect of the present invention, there is provided a method of protecting system data on a computer hard disk using a system area information table and a mapping table. The method includes the operations of (a) separately setting a system area and a buffer area on the computer hard disk and reserving areas for a meta information table, the system area information table, and the mapping table, respectively, and a data buffer area in the buffer area; (b) marking individual clusters in the system area with protection information in the system area information table based on one of a volume bitmap and a file allocation table (FAT) and initializing the mapping table and the data buffer area in the buffer area; (c) with respect to a write operation on a cluster of the system area designated by a file system, performing the write operation on a cluster of the data buffer area designated by the mapping table when the cluster of the system area is marked as "protected" in the system area information table, and performing the write operation on the cluster of the system area designated by the file system when the cluster of the system area is marked as "non-protected"; (d) with respect to a read operation on a cluster of the system area designated by the file system, performing the read operation on a cluster of the data buffer area designated by the mapping table, and performing the read operation on the cluster of the system area designated by the file system only when a value corresponding to the cluster of the system area indicates an initial state in the mapping table; (e) performing recovery by generating a new system area information table from one of the volume bitmap and the FAT and initializing the mapping table and the data buffer area in the buffer area; and (f) removing the buffer area to integrate the system area and the buffer area.

According to still another aspect of the present invention, there is provided a computer readable recording medium for recording a program for executing the above-described method on a computer.

BEST MODE FOR CARRYING OUT THE INVENTION

Hereinafter, preferred embodiments of an apparatus for protecting system data on a computer hard disk using a system area information table and a mapping table according to the present invention will be described in detail with reference to the attached drawings.

Figure 1:
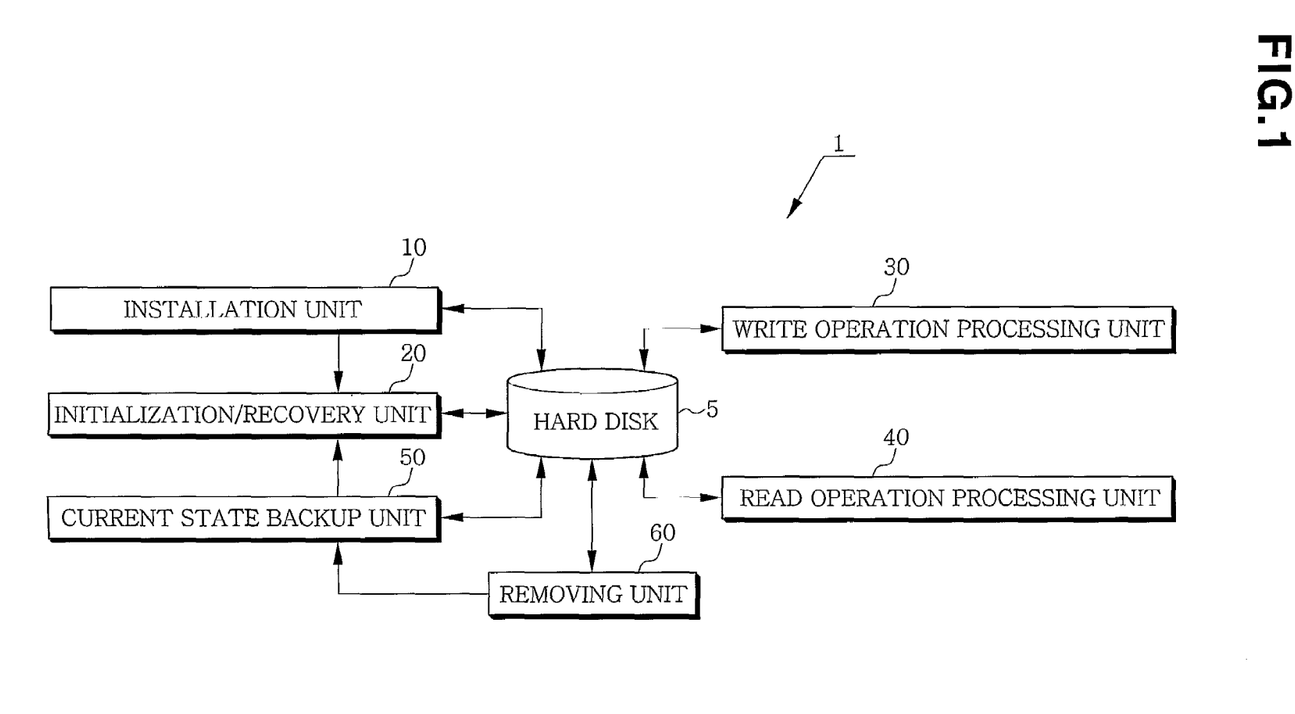
FIG. 1 is a block diagram of an apparatus for protecting system data on a computer hard disk using a system area information table and a mapping table, according to an embodiment of the present invention.

Referring to FIG. 1, an apparatus for protecting system data on a hard disk 5 according to the present invention, which will be hereinafter referred to as an hard disk protection apparatus 1, includes an installation unit 10, an initialization/recovery unit 20, a write operation processing unit 30, a read operation processing unit 40, a current state backup unit 50, and a removing unit 60. Each element of the hard disk protection apparatus 1 is implemented as a combination of hardware and software of a computer system (not shown) including the hard disk 5. The computer system using the present invention is a typical computer system, and therefore, the configuration of the hardware is obvious to those skilled in the art. Thus, a detailed description thereof will be omitted.

Figure 2:
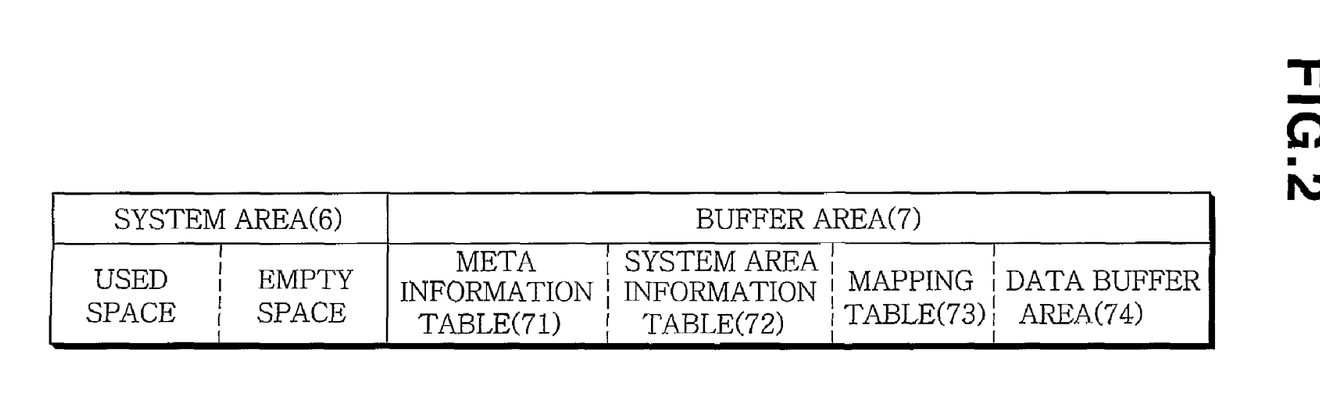
FIG. 2 is a conceptual diagram of hard disk areas divided according to an embodiment of the present invention.

The installation unit 10 receives meta information (which will be described later) including a size of a buffer area from a user and installs in the hard disk 5 software and device drivers that constitute the write operation processing unit 30, the read operation processing unit 40, and the current state backup unit 50. Thereafter, the installation unit 10 separately reserves the buffer area in a system area and moves clusters that are in use in the reserved buffer area to the system area outside the buffer area. Next, the installation unit 10 separately sets a system area 6 and a buffer area 7 in the hard disk 5, as shown in FIG. 2. In other embodiments of the present invention, at least one user data area may be further separately set in the hard disk 5. Detailed technique of segmenting the hard disk 5 has been already known, and thus, a detailed description thereof will be omitted. After setting the buffer area 7, the installation unit 10 reserves areas respectively for a meta information table 71, a system area information table 72, and a mapping table 73 and a data buffer area 74 in the buffer area 7. Next, the installation unit 10 calls the initialization/recovery unit 20 to perform initialization.

In an embodiment of the present invention, the buffer area 7 separated from the system area stores the meta information table 71, the system area information table 72, and the mapping table 73.

Figure 3:
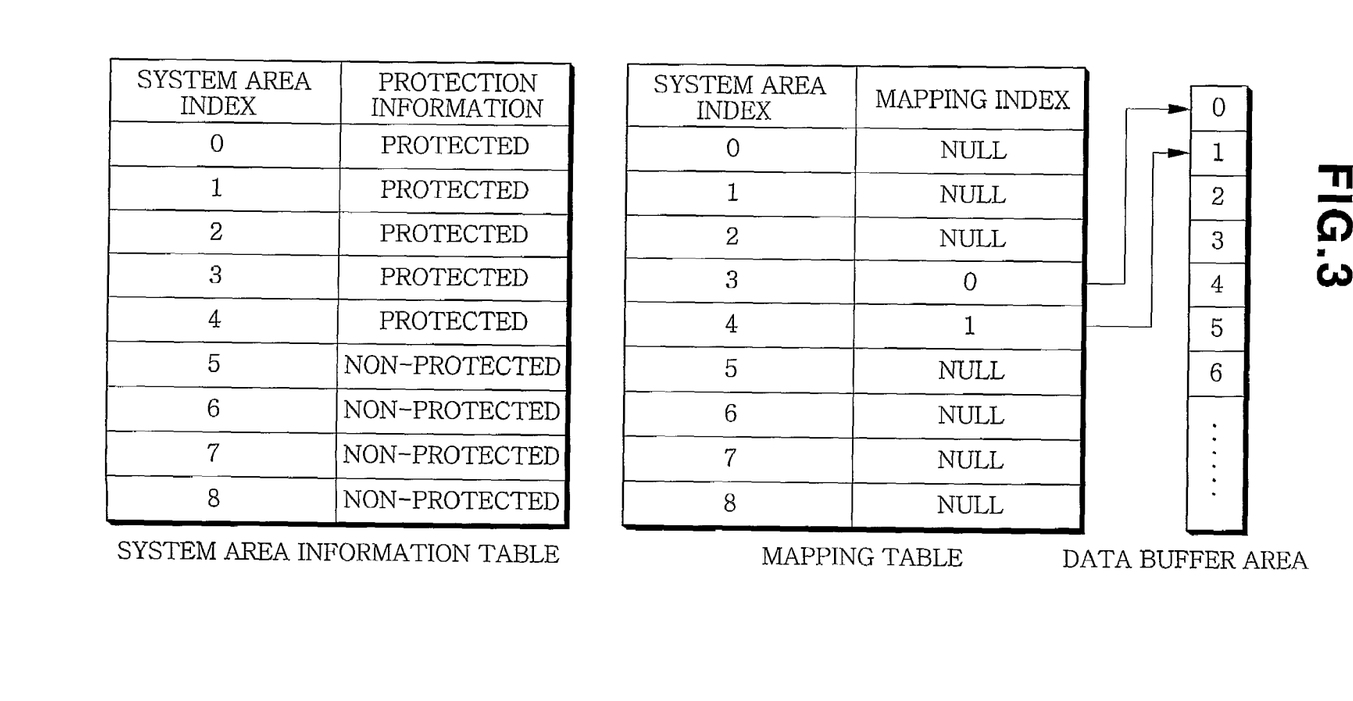
FIG. 3 illustrates the structure of a system area information table and the structure of a mapping table used in the present invention.

The system area information table 72 shows whether system data is "protected" or "non-protected" with respect to each system area index for identifying a cluster in the system area 6, as illustrated in FIG. 3.

Clusters marked as "protected" are the clusters that have already been used in the system area 6 in an initializing operation. After the initializing operation, changed content of these clusters are reflected to the buffer area 7. Meanwhile, new data added to the system area 6 after the initializing operation may be stored in clusters marked as "non-protected".

The mapping table 73 stores mapping information (or a mapping index) indicating a position in the data buffer area 74, in which changed data with respect to a system area index for the system area 6 is stored, as show in FIG. 3. Referring to FIG. 3, clusters respectively having system area indexes 3 and 4 are respectively mapped to clusters 0 and 1 in the data buffer area 74. During the initializing operation, a value of NULL is allocated to every mapping index in the mapping table 73.

Figure 4:
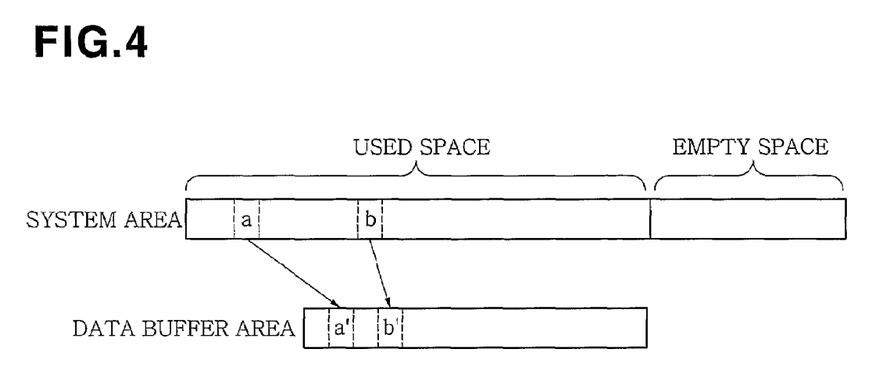
FIG. 4 illustrates the mapping relation between a system area and a data buffer area.

FIG. 4 illustrates the mapping relation between the system area 6 and the data buffer area 74.

The meta information table 71 stores various types of information, i.e., meta information used by software implementing the hard disk protection apparatus 1 (hereinafter, referred to as a "hard disk protection program") in a table format. The meta information includes a File Allocation Table (FAT) (in case of a FAT32 file system) showing a storage position of each of clusters in the system area 6, which are used by a file system for an operating system to organize files, or a volume bitmap (in case of a New Technology File System (NTFS)). The meta information may include various environment variables needed to operate the hard disk protection program, for example, used capacity of the buffer area 7, a cluster size, a start point of the data buffer area 74, an automatic recovery period, and a password.

The initialization/recovery unit 20 is operated to produce an environment for protecting system data after the hard disk protection apparatus 1 stores the system data in the system area 6 or to recover the original state of the system data when the system data stored in the hard disk 5 is corrupted. The initialization/recovery unit 20 detects space used in the system area 6 based on a volume bitmap or a FAT and marks a currently used space as "protected" and an empty space as "non-protected" with respect to individual system area indexes in the system area information table 72. In addition, the initialization/recovery unit 20 initializes the mapping table 73 and the data buffer area 74 in the buffer area 7 and generates the meta information table 71 based on the meta information.

The write operation processing unit 30 and the read operation processing unit 40 intercept and process the respective write and read operations of the operating system writing and reading data into and from files during operation of the computer system. The hard disk protection apparatus 1 manages an original change mode as meta information. In detail, when the hard disk protection apparatus 1 receives a request to change into the original change mode from a user after the initialization/recovery unit 20 performs an operation, the hard disk protection apparatus 1 changes into the original change mode so that the user can directly change data in the system area 6. Thereafter, upon receiving a request to cancel the original change mode from the user, the hard disk protection apparatus 1 returns to an original protection mode and the initialization/recovery unit 20 performs initialization.

The write operation processing unit 30 receives from the file system a system area index corresponding to a cluster on which a write operation is to be performed in the system area 6 and operates differently according to a mode. In other words, when the original change mode has been set, the write operation processing unit 30 performs the write operation on a position, i.e., the cluster designated by the file system in the system area 6. However, when the original change mode has not been set, the write operation processing unit 30 performs the write operation on a cluster in the data buffer area 74, which the designated cluster in the system area 6 is mapped to by the mapping table 73, if the system area index corresponding to the designated cluster is marked as "protected" in the system area information table 72 and performs the write operation on the designated cluster corresponding to the system area index in the system area 6 if the system area index is marked as "non-protected". When the cluster corresponding to the system area index is marked as "protected" in the system area information table 72 and is set to a value of an initial state, i.e., NULL, in the mapping table 73, the write operation processing unit 30 secures an empty space in the data buffer area 74, performs the write operation on a cluster allocated to the secured empty space, and records a position of the cluster where new data is written in a corresponding item block of the mapping table 73. Meanwhile, when content corresponding to the FAT or the volume bitmap is changed due to the operation of the write operation processing unit 30, changed content is not reflected to a FAT or a volume bitmap included in the system area 6 but a FAT or a volume bitmap included in the meta information table 71.

The read operation processing unit 40 receives from the file system a system area index corresponding to a cluster on which a read operation is to be performed in the system area 6 and operates differently according to a mode. In other words, when the original change mode has been set, the read operation processing unit 40 performs the read operation on a position, i.e., the cluster designated by the file system in the system area 6. However, when the original change mode has not been set, the read operation processing unit 40 performs the read operation on a corresponding cluster in the data buffer area 74 based on a mapping index corresponding to the system area index in the mapping table 73. Here, when the mapping index is set to NULL in the mapping table 73, the read operation processing unit 40 performs the read operation on the position, i.e., the cluster corresponding to system area index in the system area 6.

The current state backup unit 50 constructs new original system data by reflecting all content changed in the system data since the initialization. For this constructing operation, the current state backup unit 50 sequentially reads all items of the mapping table 73. When an item is not set to the initial value, i.e., NULL, the current state backup unit 50 reads data from a cluster in the data buffer area 74, which is designated by a corresponding mapping index in the mapping table 73 and writes the data to a cluster corresponding to a system area index mapped to the cluster of the data buffer area 74 by the mapping table 73. Thereafter, the initialization/recovery unit 20 performs initialization. In addition to this operation of reflecting the data stored in the data buffer area 74 to the system area 6, the current state backup unit 50 may also reflect the volume bitmap or the FAT stored in the meta information table 71 to the system area 6 before the initialization so that new original system data can include data newly added to the system area 6 as well as changed data.

The removing unit 60 removes the buffer area 7 to integrate the system area 6 and the buffer area 7. In addition, the removing unit 60 may receive confirmation on current state backup from a user so that the user can perform the backup of a current state and remove the buffer area 7 at a desired moment. Here, the removing unit may be designed to automatically remove the software and device drivers that have been installed by the installation unit 10 in the hard disk 5.

Figure 5:
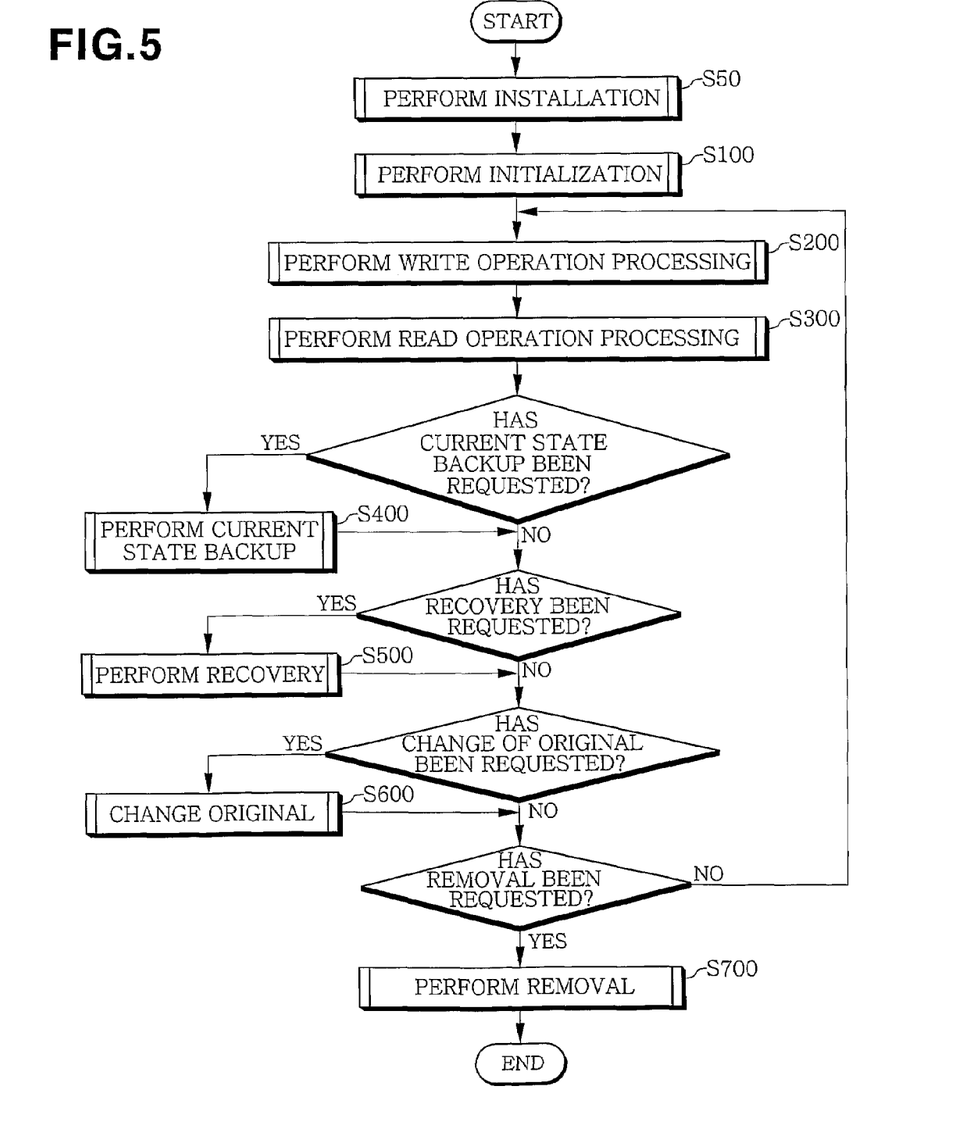
FIG. 5 is a flowchart of a method of protecting system data on a computer hard disk using a system area information table and a mapping table, according to an embodiment of the present invention.

Hereinafter, a method of protecting system data on a computer hard disk using a system area information table and a mapping table according to an embodiment of the present invention will be described in detail with reference to FIG. 5.

In operation S50, an installation module of a hard disk protection program separately sets the system area 6 and the buffer area 7 in a hard disk area of a computer system. Operation S50 will be described in detail with reference to FIG. 6.

Figure 6:
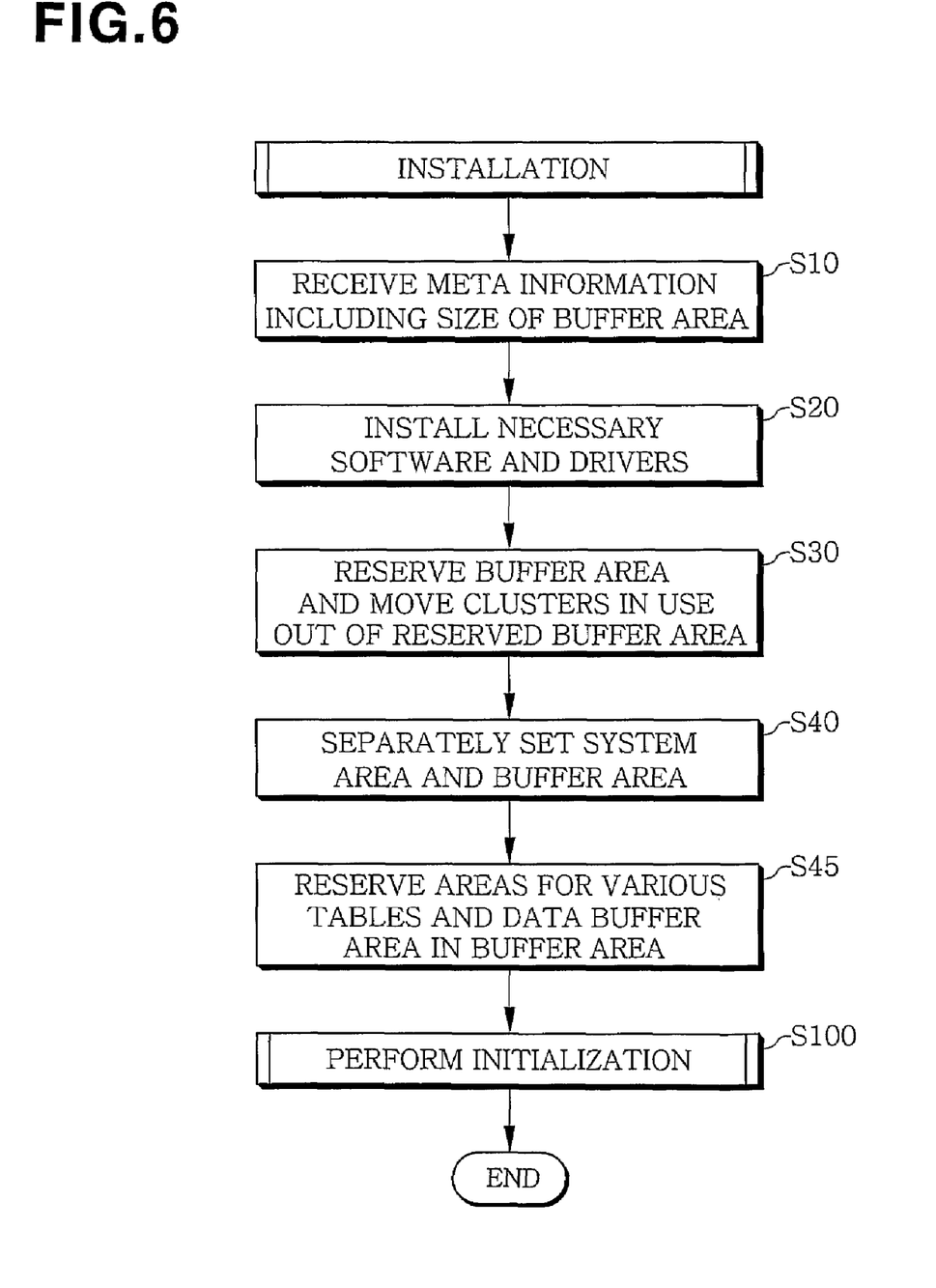
FIG. 6 is a detailed flowchart of the installing operation shown in FIG. 5.

Referring to FIG. 6, the installation module receives a size of the buffer area 7 in operation S10 and installs in the hard disk 5 software and device drivers that constitute a write operation processing module, a read operation processing module, and a current state backup module in operation S20. Thereafter, the installation module separately reserves the buffer area in a system area and moves clusters that are in use in the reserved buffer area to the system area outside the buffer area in operation S30. Next, the installation module separately sets the system area 6 and the buffer area 7 in the hard disk 5 in operation S40 and reserves areas respectively for the meta information table 71, the system area information table 72, and the mapping table 73 and a data buffer area 74 in the buffer area 7 in operation S45. The buffer area 7 set through the above operations is a hidden area from the user so that the user cannot use the buffer area 7 to store a file. Next, the installation module calls an initialization module to perform initialization in operation S100.

In operation 100, the initialization module of the hard disk protection program marks each cluster of the system area 6 as "protected" or "non-protected" in the system area information table 72 and initializes the mapping table 73 and the data buffer area 74 in the buffer area 7. Operation 100 will be described in detail with reference to FIG. 7.

Figure 7:
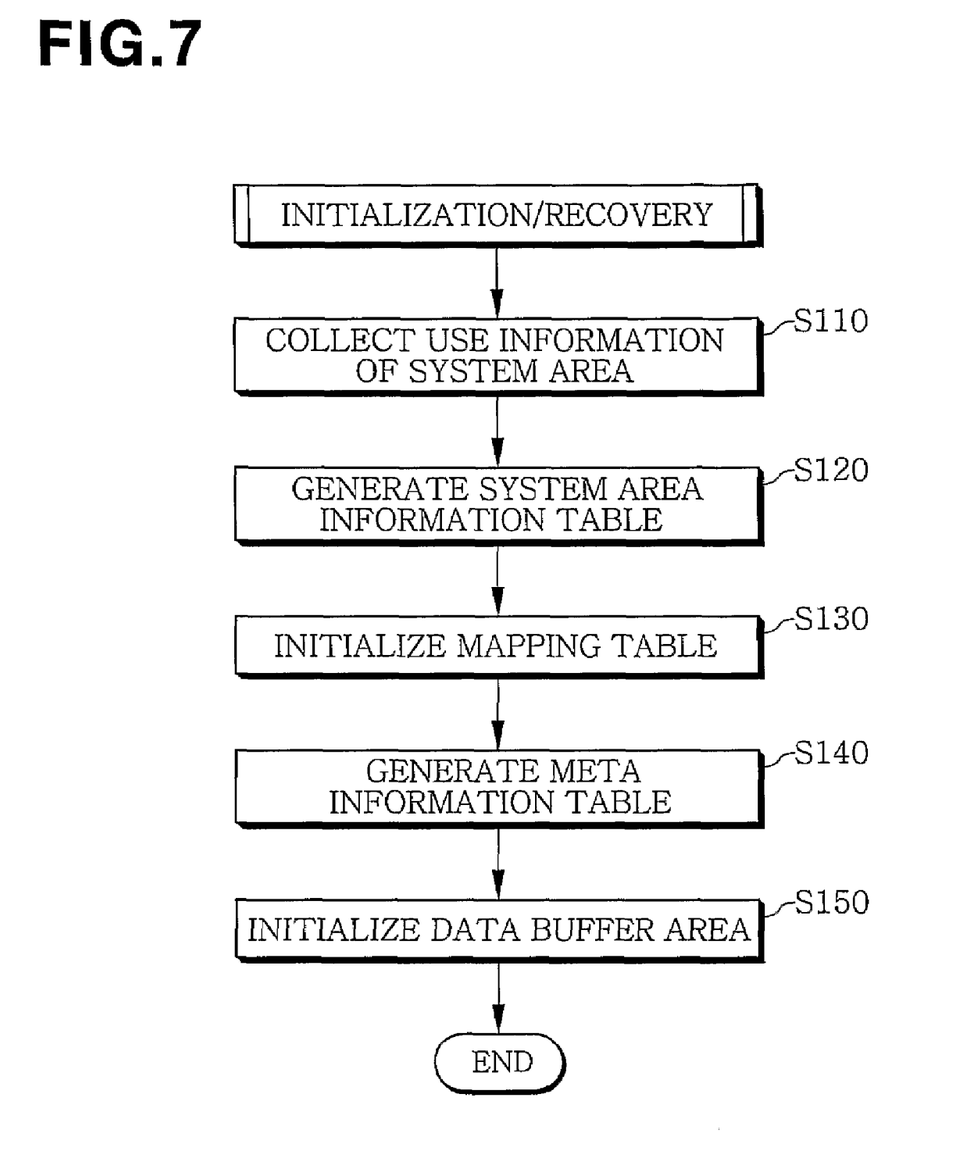
FIG. 7 is a detailed flowchart of the initializing and recovering operation shown in FIG. 5.

Referring to FIG. 7, the initialization module collects use information of the system area 6 from a volume bitmap or a FAT in operation S110. Next, in operation S120, the initialization module generates the system area information table 72 and marks a currently used space as "protected" and an empty space as "non-protected" with respect to individual system area indexes in the system area information table 72. In operation S130, the initialization module initializes all mapping indexes to NULL in the mapping table 73. In operation S140, the initialization module collects meta information and generates the meta information table 71. In operation S150, the initialization module initializes the data buffer area 74.

Thereafter, a write operation processing module and a read operation processing module of the hard disk protection program intercept and process the respective write and read operations of an operating system writing and reading data into and from the hard disk 5 during operation of the computer system in operation S200 and S300, respectively. Processing a write operation on the system area 6 (operation S200) and processing of a read operation on the system area 6 (S300) will be described in detail with reference to FIGS. 8 and 9, respectively.

Figure 8:
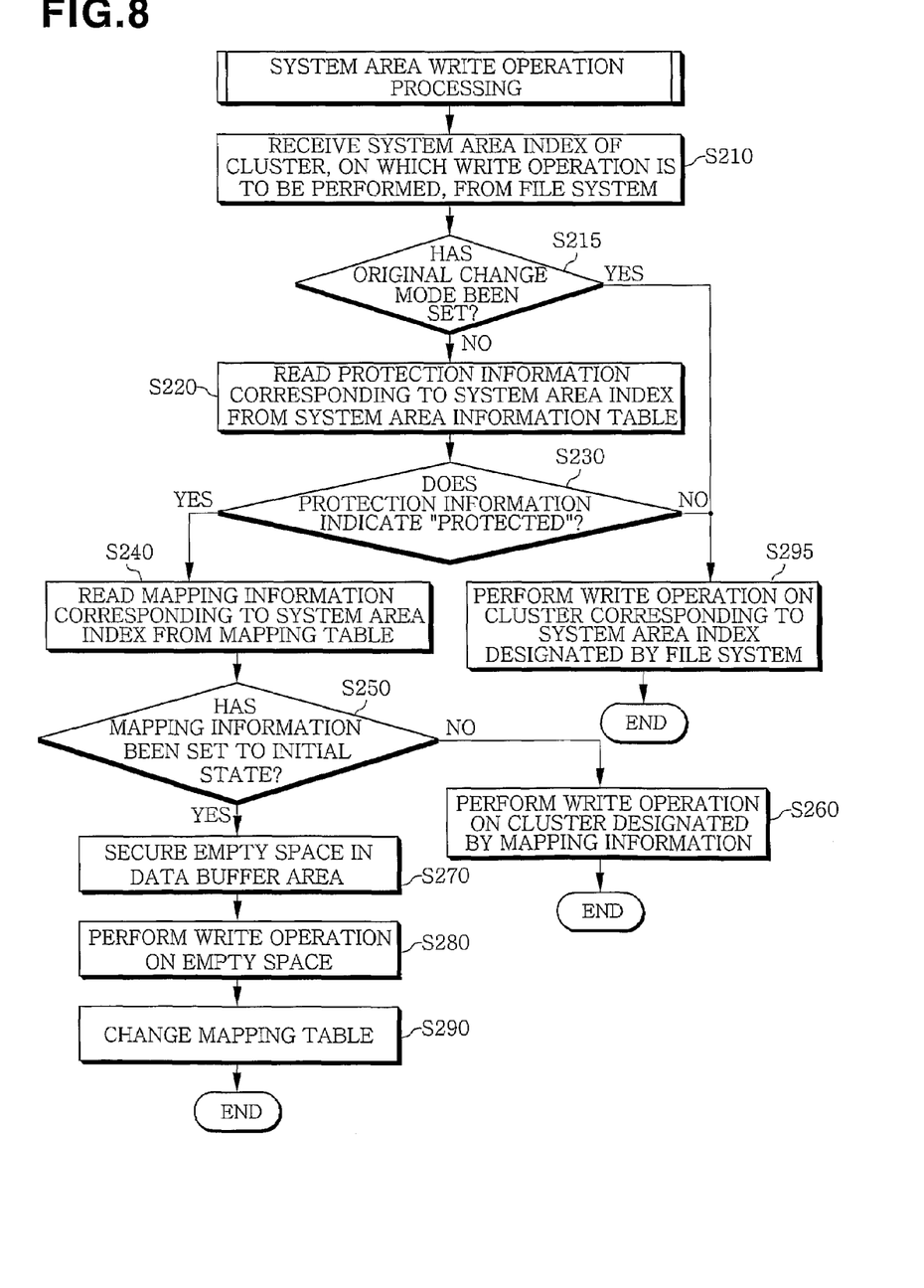
FIG. 8 is a detailed flowchart of write operation processing shown in FIG. 5.

The write operation processing module receives from a file system a system area index corresponding to a cluster on which a write operation is to be performed in the system area 6 in operation S210 and determines whether an original change mode has been set in operation S215. If it is determined that the original change mode has been set, the write operation processing module performs the write operation on a position, i.e., the cluster designated by the file system in the system area 6 in operation S295. However, if it is determined that the original change mode has not been set, the write operation processing module reads protection information corresponding to the system area index from the system area information table 72 in operation S220. When the protection information is read as "protected" in operation S230, the write operation processing module reads mapping information corresponding to the system area index from the mapping table 73 in operation S240. When the mapping information does not have a value of an initial state (i.e., NULL) in operation S250, the write operation processing module performs the write operation on a cluster corresponding to the value of the mapping information in the data buffer area 74 in operation S260. However, when the mapping information has the value of the initial state in operation S250, the write operation processing module secures an empty space in the data buffer area 74 in operation S270 and performs the write operation on a cluster allocated to the empty space in operation S280. Thereafter, in operation S290, the write operation processing module records a position of the cluster, where new data is written, in a corresponding item block of the mapping table 73. Meanwhile, when the protection information read in operation S230 is "non-protected", the write operation processing module performs the write operation on the position, i.e., the cluster designated by the file system in the system area 6 in operation S295. Here, the write operation processing module reflects changed content corresponding to a FAT or a volume bitmap to a FAT or a volume bitmap included in the meta information table 71 not in the system area 6.

Figure 9:
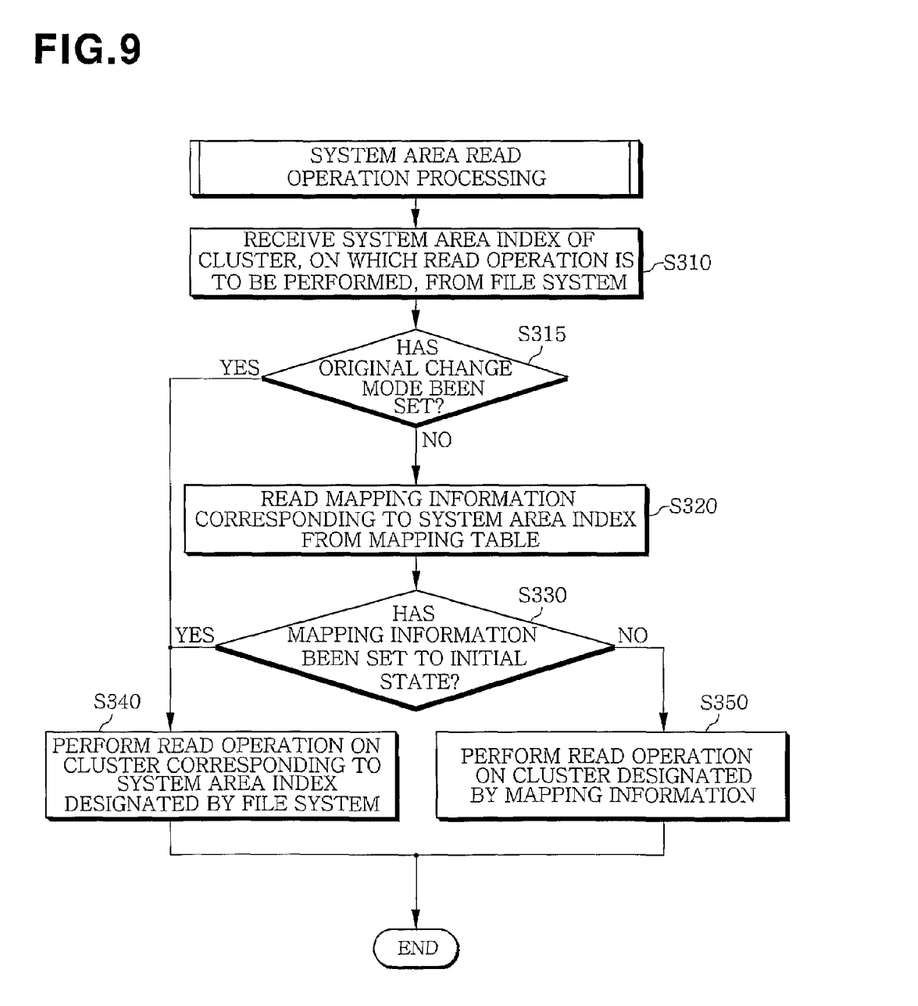
FIG. 9 is a detailed flowchart of read operation processing shown in FIG. 5.

Referring to FIG. 9, the read operation processing module receives from the file system a system area index corresponding to a cluster on which a read operation is to be performed in the system area 6 in operation S310 and determines whether the original change mode has been set in operation S315. If it is determined that the original change mode has been set, the read operation processing module performs the read operation on a position, i.e., the cluster designated by the file system in the system area 6 in operation S340. However, if it is determined that the original change mode has not been set, the read operation processing module reads mapping information corresponding to the system area index from the mapping table 73 in operation S320. When it is determined that the mapping information is set to the value of the initial state (i.e., NULL) in operation S330, the read operation processing module performs the read operation on the position, i.e., the cluster designated by the file system (i.e., the cluster corresponding to the system area index) in the system area 6 in operation S340. However, when it is determined that the mapping information is not set to the value of the initial state, the read operation processing module performs the read operation on a cluster in the data buffer area 74 that corresponds to a value of the mapping information designated by the mapping table 73 in operation S350.

When the user requests current state backup or when a current state backup period set according to environment variables comes around, the hard disk protection program performs current state backup to maintain the current state of the system data as new original system data using a current state backup module in operation S400, which will be described in detail with reference to FIG. 10.

Figure 10:
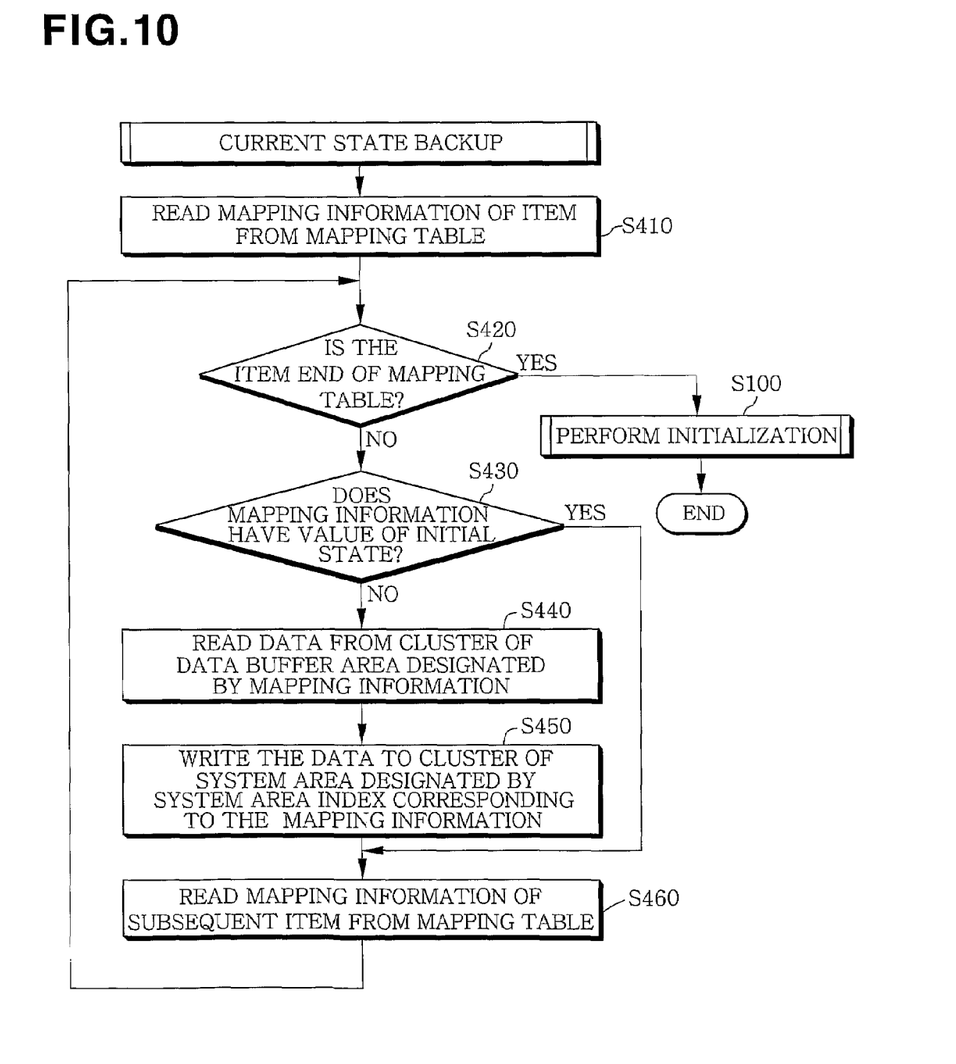
FIG. 10 is a detailed flowchart of the current state backup operation shown in FIG. 5.

Referring to FIG. 10, the current state backup module performs backup while sequentially reading mapping information of each of items constituting the mapping table 73 in operations S410 and S460. When the mapping information does not have the value of the initial state (i.e., NULL) in operation S430, the current state backup module reads data from a cluster of the data buffer area 74 that is designated by the value of the mapping information in operation S440 and writes the data to a cluster of the system area 6 that is designated by a system area index corresponding to the mapping information in operation S450. If the mapping information has the value of the initial state, no data is allocated to or changed data has already been stored in the corresponding cluster of the system area 6, and therefore, it is not necessary to perform the backup with respect to a current item in the mapping table 73. When the backup is completed with respect to all items of the mapping table 73 in operation S420, it is needed to reflect a volume bitmap or a FAT stored in the meta information table 71 to the system area 6. After the backup is completed, initialization is performed by the initialization module in operation S1 00, thereby having new original system data.

When the user requests recovery or a recovery period set according to the environment variables comes around, the hard disk protection program deletes all content, which has been changed in the system area 6 since the initialization, using a recovery module in operation S500. Here, the recovery module performs the same operations shown in FIG. 7 as the initialization module.

After the recovery, when the user requests to change a mode into the original change mode, the hard disk protection program changes the system mode into the original change mode and performs the change of the original in operation S600. In the original change mode, the user can directly change data in the system area 6, as described with reference to FIG. 8. Thereafter, when the user requests to cancel the original change mode, the initialization is performed as shown in FIG. 7 to change the system mode into an original protection mode.

When the user requests to remove the hard disk protection program, a removing module integrates the system area 6 and the buffer area 7 and removes the hard disk protection program from the hard disk 5 in operation S700, which will be described in detail with reference to FIG. 11.

Figure 11:
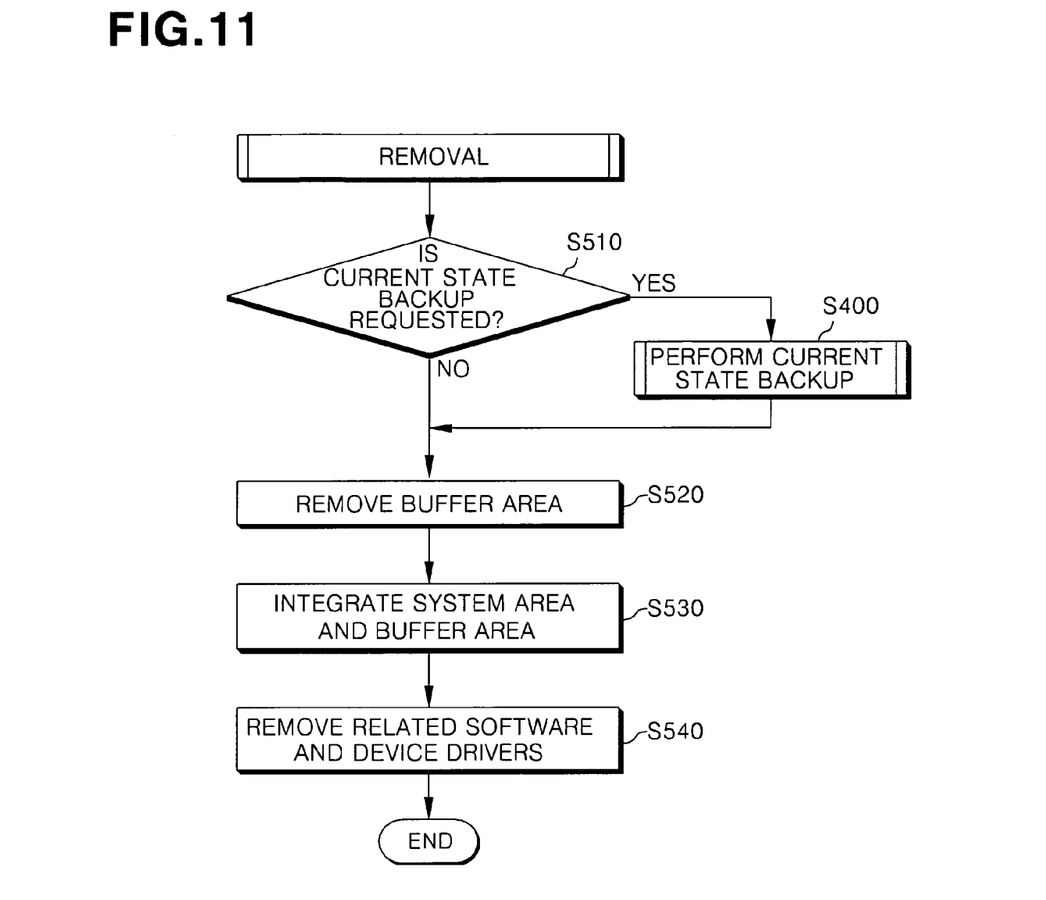
FIG. 11 is a detailed flowchart of the removing operation shown in FIG. 5.

Referring to FIG. 11, the removing module receives confirmation on the current state backup from the user in operation S510 and calls the current state backup module to perform the current state backup in operation 400 when the user wants the current state backup. Thereafter, the removing module removes the buffer area 7 set by the installation module in operation S520 and integrates the system area 6 and the buffer area 7 into a single system area in operation S530. In addition, the removing module automatically removes the software and device drivers constituting the hard disk protection program from the hard disk 5 in operation S540.

The present invention can be realized as a program (i.e., a hard disk protection program) which is recorded on a computer readable recording medium and can be read by a computer. The computer readable recording medium may be a magnetic storage medium (e.g., a ROM, a floppy disk, or a hard disk), an optical readable medium (e.g., CD-ROM or DVD), or carrier waves (for example, transmitted through Internet).

While this invention has been particularly shown and described with reference to preferred embodiments thereof, it will be understood by those skilled in the art that various changes may be made therein without departing from the scope of the invention. Therefore, the above-described embodiments will be considered not in restrictive sense but in descriptive sense only. The scope of the invention will be defined not by the above description but by the appended claims, and it will be construed that all differences made within the scope defined by the claims are included in the present invention.

INDUSTRIAL APPLICABILITY

According to the present invention, system data set as an original is not changed at all since initialization, and therefore, corrupted system data can be quickly recovered just by performing initialization. Since changes in only part needing protection in a system area are separately managed in a buffer area by using a system area information table and a mapping table, time taken to access the system data can be reduced, thereby minimizing the decrease of system processing speed. In addition, the use of a data buffer area can be remarkably reduced, and therefore, a large system area can be protected with a small data buffer area.

Moreover, since only the mapping table is used for a read operation on the system area and a current state backup operation, additional processing time is minimized.

Furthermore, the present invention provides a method of automatically reflecting system data that is currently in use to a recovery original using the mapping table and the system area information table so that a user can easily change the recovery original and the system data is prevented from being fatally damaged due to an attack of a virus program or the user's mistake during the change of the recovery original.

What is claimed is:

1. An apparatus for protecting system data on a computer hard disk using a system area information table and a mapping table, the apparatus comprising:

an installation unit separately setting a system area and a buffer area on the computer hard disk and reserving areas for a meta information table, the system area information table, and the mapping table, respectively, and a data buffer area in the buffer area;

an initialization/recovery unit marking individual clusters in the system area with protection information in the system area information table based on one of a volume bitmap and a file allocation table (FAT) and initializing the mapping table and the data buffer area in the buffer area;

a write operation processing unit, with respect to a write operation on a cluster of the system area designated by a file system, performing the write operation on a cluster of the data buffer area designated by the mapping table when the cluster of the system area is marked as "protected" in the system area information table, and performing the write operation on the cluster of the system area designated by the file system when the cluster of the system area is marked as "non-protected";

a read operation processing unit, with respect to a read operation on a cluster of the system area designated by the file system, performing the read operation on a cluster of the data buffer area designated by the mapping table, and performing the read operation on the cluster of the system area designated by the file system only when a value corresponding to the cluster of the system area indicates an initial state in the mapping table;

a current state backup unit sequentially reading all items of the mapping table one by one, reading data from a cluster of the data buffer area designated by a value of a read item of the mapping table and writing the data to a cluster of the system area corresponding to the cluster of the data buffer area when the value of the item does not indicate an initial state, and then calling the initialization/recovery unit to perform initialization; and a removing unit removing the buffer area set by the installation unit to integrate the system area and the buffer area.

2. The apparatus of claim 1, wherein when the cluster of the system area is marked as "protected" in the system area information table and has a value of the initial state in the mapping table, the write operation processing unit secures an empty space in the data buffer area, performs the write operation on a cluster allocated to the secured empty space, and records a position of the cluster, where new data is written, in a corresponding item block of the mapping table.

3. The apparatus of claim 1, wherein when an original change mode has been set, the write operation processing unit performs the write operation on the cluster of the system area designated by the file system, and the read operation processing unit performs the read operation on the cluster of the system area designated by the file system.

4. A method of protecting system data on a computer hard disk using a system area information table and a mapping table, the method comprising the operations of:

(a) separately setting a system area and a buffer area on the computer hard disk and reserving areas for a meta information table, the system area information table, and the mapping table, respectively, and a data buffer area in the buffer area;

(b) marking individual clusters in the system area with protection information in the system area information table based on one of a volume bitmap and a file allocation table (FAT) and initializing the mapping table and the data buffer area in the buffer area;

(c) with respect to a write operation on a cluster of the system area designated by a file system, performing the write operation on a cluster of the data buffer area designated by the mapping table when the cluster of the system area is marked as "protected" in the system area information table, and performing the write operation on the cluster of the system area designated by the file system when the cluster of the system area is marked as "non-protected";

(d) with respect to a read operation on a cluster of the system area designated by the file system, performing the read operation on a cluster of the data buffer area designated by the mapping table, and performing the read operation on the cluster of the system area designated by the file system only when a value corresponding to the cluster of the system area indicates an initial state in the mapping table;

(e) performing recovery by generating a new system area information table from one of the volume bitmap and the FAT and initializing the mapping table and the data buffer area in the buffer area; and (f) removing the buffer area to integrate the system area and the buffer area.

5. The method of claim 4, further comprising, before operation (e), (g) sequentially reading all items of the mapping table one by one, reading data from a cluster of the data buffer area designated by a value of a read item of the mapping table and writing the data to a cluster of the system area corresponding to the cluster of the data buffer area when the value of the item does not indicate the initial state, and then performing operation (b).

6. The method of claim 4, wherein operation (c) comprises, when the cluster of the system area is marked as "protected" in the system area information table and has a value of the initial state in the mapping table, securing an empty space in the data buffer area, performing the write operation on a cluster allocated to the secured empty space, and recording a position of the cluster, where new data is written, in a corresponding item block of the mapping table.

7. The method of claim 4, wherein when an original change mode has been set, operation (c) comprises performing the write operation on the cluster of the system area designated by the file system, and operation (d) comprise performing the read operation on the cluster of the system area designated by the file system.

8. The apparatus of claim 2, wherein when an original change mode has been set, the write operation processing unit performs the write operation on the cluster of the system area designated by the file system, and the read operation processing unit performs the read operation on the cluster of the system area designated by the file system.

* * * * *